W. S. MINOR.
PITMAN COUPLING.
APPLICATION FILED NOV. 23, 1914.
1,156,918.
Patented Oct. 19, 1915.
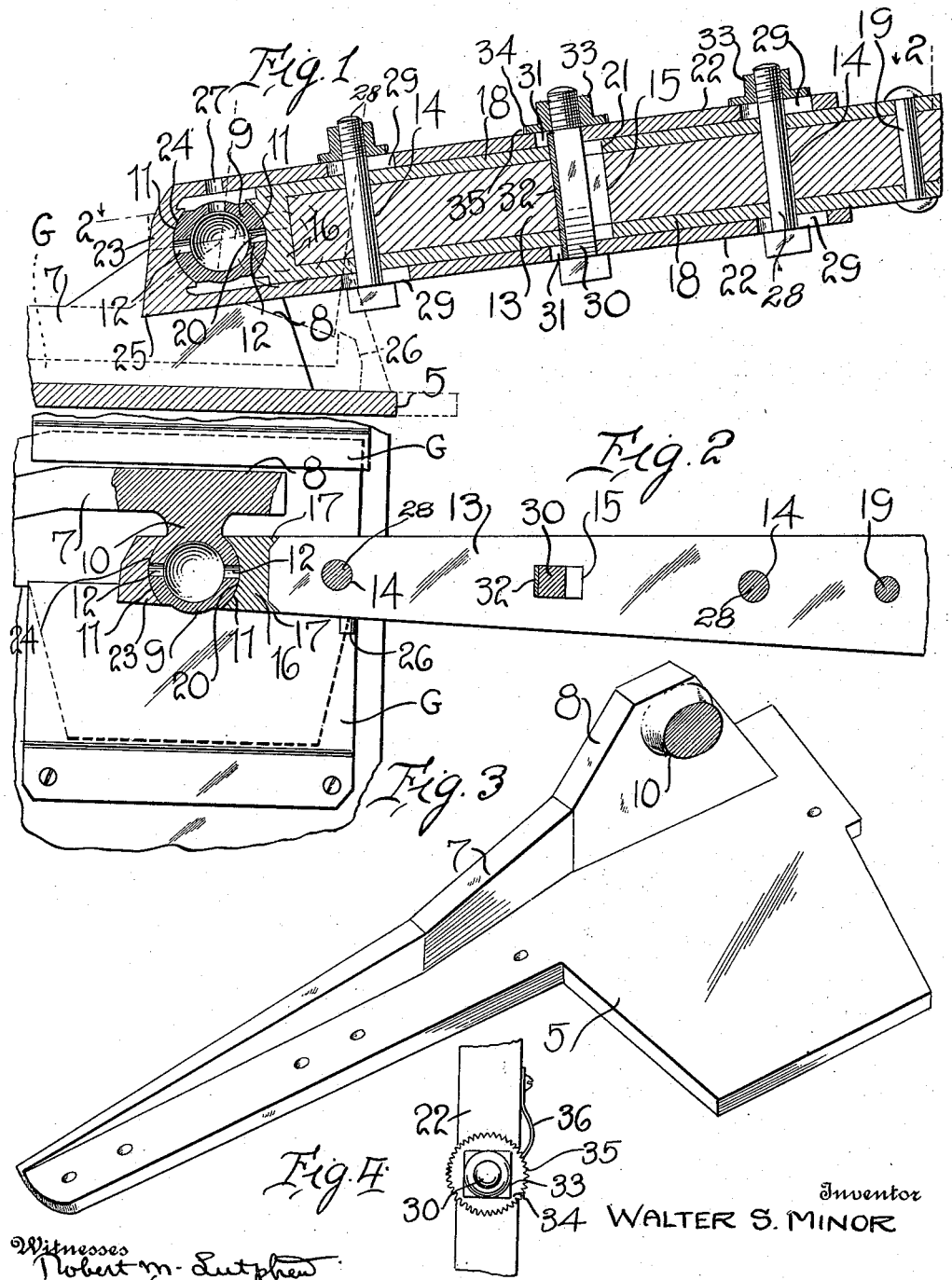
Inventor
WALTER S. MINOR
By Watson E. Coleman
Attorney
Witnesses
Robert M. Lutphen
A. A. Hind

UNITED STATES PATENT OFFICE.

WALTER S. MINOR, OF CUNNINGHAM, TENNESSEE.

PITMAN-COUPLING.

1,156,918. Specification of Letters Patent. Patented Oct. 19, 1915.

Application filed November 23, 1914. Serial No. 873,566.

*To all whom it may concern:*

Be it known that I, WALTER S. MINOR, a citizen of the United States, residing at Cunningham, in the county of Montgomery and State of Tennessee, have invented certain new and useful Improvements in Pitman-Couplings, of which the following is a specification, reference being had to the accompanying drawings.

This invention relates to an improved pitman coupling which is primarily designed for use in connection with the sickle of a mowing machine, and has for its primary object to provide improved means for connecting or coupling the pitman to the sickle whereby a direct thrust is imparted thereto which results in the elimination of undue friction and excessive wear, thus greatly prolonging the life of the coupling.

The invention has for a further object to produce a pitman coupling which will be absolutely free from cramping or binding between the parts thereof, irrespective of the position to which the cutter bar may be adjusted.

One of the detail objects of the invention is to provide means upon one of the elements of the coupling which will prevent a disconnection of the sickle, when the latter is raised to a vertical position with respect to the pitman.

It is a further general object of the invention to improve and simplify the construction of devices of the above character, whereby the same may be easily and quickly assembled in connection with the movable part actuated by the pitman, and the device readily adjusted to compensate for wear and thereby overcome lost motion.

With the above and other objects in view, my invention consists in the novel features of construction, combination, and arrangement of parts to be hereinafter more fully described, claimed, and illustrated in the accompanying drawings, in which, Figure 1 is a longitudinal section of a pitman connection or coupling embodying the preferred form of my invention, showing the same connected to the head of a sickle; Fig. 2 is a section taken on the line 2—2 of Fig. 1; Fig. 3 is a detail perspective view of the sickle head to which the sickle bar is secured; and Fig. 4 is a detail view showing the means employed for locking the nuts on the coupling bolts.

Referring in detail to the drawing, 5 designates the sickle head which includes a base plate having an upstanding longitudinally tapering flange 7 formed upon one of its longitudinal edges. One end of this flange is enlarged as at 8, and upon the same the male element of the coupling is integrally formed. This element consists of a hollow ball of spherical formation 9 which is produced upon the outer end of an inwardly projecting neck or extension 10 formed upon the enlarged end 8 of the flange 7. This neck is of greatest diameter at its point of juncture with the flange end 8, and its outer end portion is of ellipsoidal cross-sectional form, the longitudinal axis thereof being of greater length than its vertical axis. The ball or sphere 9 is provided upon opposite sides with the spherical enlargements indicated at 11, the particular purpose of which will hereinafter appear. The ball or sphere 9 is hollow, and a plurality of openings 12 lead to the interior thereof, one of said openings extending through the top of the hollow sphere and the others through the opposite sides thereof.

The wood pitman bar or arm indicated at 13 tapers longitudinally as shown, and is provided with spaced bolt receiving circular openings 14. Intermediate of these bolt receiving openings, a rectangular longitudinally extending opening 15 is formed in the pitman. One half of the female section of the coupling consists of a solid metal head or block 16 which is disposed across the end face of the pitman arm or bar. This end face of the pitman arm at the opposite sides of the arm is beveled or chamfered and the head or block 16 has correspondingly beveled flanges 17 formed thereon which serve to eliminate any tendency of said block to shift upon the end face of the arm, and relieve the coupling bolts to be hereinafter referred to, of undue strain. Upon the opposite ends of the head or block 16, the parallel metal straps 18 are formed. These straps extend along the upper and lower faces of the pitman arm and are suitably secured thereto by one or more rivets indicated at 19. The outer face of the head or block 16 is formed with a concavity 20 for sliding engagement upon the convex face of one of the circular enlargements 11 formed upon the hollow ball or sphere 9. The longitudinal straps 18 are provided with longitudinally extending slots or openings 21 which are adapted to register with the slot 15 formed in the pitman arm.

The other section of the female part of the coupling includes spaced parallel metal bars or straps 22 which are integrally connected at one of their ends as at 23. Upon the inner face of this connection between the metal straps a boss is formed having a concave face 24 for sliding engagement upon the other of the circular projections 11 formed upon the ball 9. The connection 23 is also formed with an exterior extension or projection 25 which is designed for the purpose of preventing the pitman and sickle bar from dropping down when the cutter bar is raised to a vertical position. To this end, an upturned lug 26 is formed upon the sickle bar guide G for contact with the projection 25. The upper metal strap 22 is formed with an opening 27 which coincides with the opening 12 in the top of the ball 9 so that a suitable lubricating oil may be supplied to the interior of said hollow ball.

Fastening bolts 28 are adapted for insertion through the openings 14 in the pitman arm and corresponding openings in the straps or bars 18. The outer metal straps 22 of the female section of the coupling are formed with elongated slots 29 to receive said bolts, whereby said latter straps may be shifted or adjusted longitudinally with respect to the straps 18 of the other coupling section. A square or rectangular bolt 30 is adapted to be inserted through additional rectangular slots 31 in the metal straps 22 and through the slots 21 in the straps 18. When first applied, the rectangular bolt 30 is in contact with the rear or inner ends of the slots 31 and with the outer ends of the slots 21 and the opening 15. In the event of excessive wear upon the parts of the coupling, a packing strip 32 of suitable material may be inserted into the opening 15 and slots 21 between the outer end walls thereof and the opposed face of the rectangular bolt 30. One end of each of the bolts 28 and 30 projects above the upper metal strap 22 and is threaded to receive a nut 33. This nut is formed with a flange 34 having teeth or serrations 35 formed in its periphery. A spring locking plate 36 is fixed at one of its ends to the edge of the metal strap 22, and is engaged at its other free end with the teeth 35 to securely lock the nut against reverse turning movement after it has been threaded inwardly upon the bolt and tightened against the face of the metal strap.

From the foregoing description, taken in connection with the accompanying drawing, the construction, manner of operation, and several advantages of my invention will be clearly and fully understood. By coupling the pitman bar or arm to the head of the sickle bar in the manner above explained, there is a direct longitudinal thrust and pull upon said bar which eliminates a great deal of wear or friction between the male and female elements of the coupling. The sickle bar may also be readily adjusted, without cramping or binding between the parts. This is due to the formation of the circular convex projections 11 upon the male element of the coupling. It will be apparent that the concave faces 20 and 24 of the sections of the female coupling will at all times be free to move thereon to various positions, and such movement will not be restricted or in any way interfered with by wear upon the contacting faces. In the ordinary coupling of this character, grooves are soon worn in the periphery of the male coupling member so that shoulders are formed therein which will prevent or at least seriously interfere with the adjustment of the sickle to other positions from that which it normally occupies with respect to the pitman. It will also be manifest that the several parts of the device may be very easily and quickly assembled, and as they are all of simple formation and may be readily cast, the manufacturing cost will be comparatively small. The quickness and facility with which the outer section of the female part of the coupling may be adjusted to compensate for any wear which may occur, is also a very important and highly advantageous feature of the invention.

While I have shown and described the preferred construction and arrangement of the several elements employed, it will be understood that the invention is susceptible of considerable modification therein, and I therefore reserve the privilege of resorting to all such legitimate changes as may be fairly resorted to without departing from the spirit or scope of the invention as claimed.

Having thus fully described my invention, what I desire to claim and secure by Letters Patent is:—

1. A pitman coupling including a spherical male coupling element on the reciprocating part, two female coupling sections having longitudinally extending straps adjustable upon each other, said female sections being provided with concave bearing surfaces for engagement upon opposite sides of the spherical male coupling element, a fastening bolt extending through the pitman and the straps of the female coupling sections to secure the latter in their adjusted positions to the pitman, and means for adjusting said fastening bolt longitudinally of the pitman.

2. A pitman coupling including a spherical male coupling element on the reciprocating part, two female coupling sections having superposed longitudinally extending straps and provided with opposed concave bearing surfaces for engagement upon opposite sides of the male coupling element, said straps being provided with longitudinal slots, a bolt extending transversely through the pitman and through said slots to secure the female coupling elements in their adjusted positions upon the pitman, and removable spacing means arranged in the bolt opening through the pitman whereby the bolt may be adjusted longitudinally of the pitman.

3. A pitman coupling including a spherical male coupling element on the reciprocating part provided with spherical enlargements upon opposite sides, female coupling sections each including longitudinally extending parallel straps integrally connected at one of their ends, the straps of one section being permanently secured to the pitman and the straps of the other section superposed upon the first named straps, each of said female sections being provided with a concave bearing face for engagement upon one of the enlargements of the male coupling element, and means for adjustably clamping the last named female section upon the pitman against relative movement with respect to the other female section.

In testimony whereof I hereunto affix my signature in the presence of two witnesses.

WALTER S. MINOR.

Witnesses:
G. A. MINOR,
L. MORGAN.

Copies of this patent may be obtained for five cents each, by addressing the "Commissioner of Patents, Washington, D. C."